United States Patent
Seal et al.

(10) Patent No.: US 6,549,118 B1
(45) Date of Patent: Apr. 15, 2003

(54) SECURITY APPARATUS AND METHOD

(75) Inventors: Christopher Henry Seal, Stowmarket (GB); David John McCartney, Ipswich (GB); Maurice Merrick Gifford, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,997
(22) PCT Filed: Jan. 19, 1998
(86) PCT No.: PCT/GB98/00154
§ 371 (c)(1),
(2), (4) Date: Mar. 16, 1999
(87) PCT Pub. No.: WO98/32093
PCT Pub. Date: Jul. 23, 1998

(30) Foreign Application Priority Data

Jan. 17, 1997 (EP) .............................................. 97300328

(51) Int. Cl.$^7$ ............................ G06F 7/00; G08C 19/00
(52) U.S. Cl. ..................... 340/5.82; 340/5.52; 382/117
(58) Field of Search ....................... 340/825.34, 825.31, 340/5.52, 53, 5.8, 81, 5.82, 83, 5.84; 382/118, 2, 115, 116, 117; 713/186; 902/3

(56) References Cited

U.S. PATENT DOCUMENTS 5,291,560 A * 3/1994 Daugman ....................... 382/2
5,991,429 A * 11/1999 Coffin et al. ................. 382/118

* cited by examiner

*Primary Examiner*—Michael Horabik
*Assistant Examiner*—William Bangachon
(74) *Attorney, Agent, or Firm*—Nixon & Vanderhye P.C.

(57) ABSTRACT

In a method of using iris recognition to determine whether a person is authorised to pass a security check, the person is first identified by comparing a captured and digitised iris code with iris codes stored in a database of iris codes for authorised persons. Then, the iris code for an identified person is compared with all previously recorded iris codes for that person. If there is an exact match, the identified iris code is deemed irregular since the chances of obtaining an exact match are significantly low. As a result, either further identifying information is requested or access to resources or systems is denied to the person.

16 Claims, 3 Drawing Sheets

SECURITY APPARATUS AND METHOD

BACKGROUND OF THE INVENTION

1. Field of the Invention

The present invention relates to apparatus and methods for use in providing a security check. It has particular utility in relation to apparatus which uses recognition methods which rely on a data sequence which varies unpredictably from one use to the next.

2. Description of Related Art

Known security checks control, amongst other things, access to a building, access to a secure computer system or allow an authorised person to withdraw cash from his or her bank account. Normally, a user is required to enter an alphanumeric password (this may be for example a Personal Identification Number associated with the authorised person's bank account). If the password tallies with a stored password associated with the authorised person then the user passes the security check. Problems arise where an unauthorised person learns the password—that person is then able to pass the security check easily.

More recently, the use of digital signatures rather than alphanumeric passwords has been suggested. Many types of digital signature reflect a physiological characteristic (known as a biometric) of a person. The physiological characteristic underlying these signatures cannot be provided by another person—hence a biometric-based digital signature offers greater security than conventional passwords. Biometrics that have been suggested include fingerprints, voice samples, retinal scans and iris patterns. Other types of digital signature, such as a digitised version of a person's written signature, have also been considered.

In contrast to an alphanumeric password, the probability of obtaining exactly the same digital signature from, for example, a biometric or a written signature in any two attempts is often low, and recognition based on such inconstant digital signatures relies on obtaining a digital signature which is sufficiently close to a reference digital signature. For example, in relation to iris recognition, the differences between measured iris codes typically result from differences in camera set-up, illumination level variations, or because of partial eyelid closure or debris or dust on spectacles, etc. In the case of written signatures, differences in the digital signature occur not only because of differences in data capture but also because of variation in the written signatures themselves.

European patent application 0 392 159 discloses a written signature verification method in which a user's written signature is compared to a reference signature supplied by an authorised person who the user is purporting to be. The reference signature is supplied during an enrollment procedure. If there are significant differences between the instant signature provided by a user and the reference signature provided by the authorised person the user is purporting to be, then the user is regarded as an impostor. If the two signatures are extraordinarily similar then the signature is regarded as a forgery. Only if the differences between the reference signature and the user's signature are of the degree expected is the user verified to be the authorised person.

A problem common to many security checks is that the level of security that can be provided on enrolling an authorised person cannot be matched in locations where a user may subsequently attempt to pass the security check. For example, in a system enabling remote users to access a shared resource, the password or digital signature on which the security check relies must be sent across communications links before being checked—this situation might for example arise in relation to automated teller machines provided by a bank. Furthermore, in some situations the apparatus which digitises the written signature or biometric is vulnerable to being altered in order to facilitate unauthorised access. For example, an unauthorised user might connect a digital memory inside a point of sale device in order to learn the passwords or digital signatures of authorised persons who subsequently use the device.

One way to avoid the above problems is to timestamp each password or digital signature before sending it. However, the provision of a timestamp requires the distributed nodes of the system to be synchronised—this is both difficult and expensive to implement.

BRIEF SUMMARY OF THE INVENTION

According to a first aspect of the present invention there is provided a method of determining whether a person is authorised to pass a security check on the basis of an inconstant digital signature, the method comprising the steps of:

comparing an instant digital signature provided by a person attempting to pass the security check with a stored digital signature;

identifying the person as the person who provided said stored digital signature responsive to said comparison revealing said signatures to be sufficiently similar; said method being characterised by;

comparing said instant digital signature and one or more previous digital signatures provided in previous attempts to pass the security check; and invalidating the identification responsive to said comparison revealing said instant signature to be improbably similar to one or more of the previous signatures.

By arranging the apparatus to check that an inconstant digital signature does not match a previously submitted version of the signature too closely, the danger of an eavesdropper being able to gain unauthorised access to the system is reduced.

In some embodiments, the identification is invalidated only on said instant signature being identical to a previous signature. In this case, an eavesdropper who exactly copies a previous digital signature will be denied passage through the security check, whilst the chance of an authorised person being denied access mistakenly is reduced.

In other embodiments, the identification is also invalidated on said instant digital signature closely matching one or more previous signatures. This has the advantage or thwarting unauthorised users who attempt to breach the security check by using, for example, a cast of a finger to provide a fingerprint, or a photograph of an eye to provide an iris pattern or a facsimile of a written signature.

In preferred embodiments: comparing the instant digital signature with the reference signature involves calculating a first measure of similarity between the instant and reference signatures; the user is identified as an authorised person on the first measure of similarity exceeding a predetermined first threshold; comparing the instant digital signature with one or more previous digital signatures involves calculating one or more second measures of similarity between the instant and previous signatures; and the identification of the user is invalidated on the second measure of similarity exceeding a predetermined second threshold higher than the first and one or both of said first and second thresholds are adaptable. This provides an advantage that differences between authorised persons in the inherent deviation in their digital signatures can be compensated for. In addition, differences in an authorised person's digital signature that might occur owing to location or time could be compensated for in this way.

According to a second aspect of the present invention, there is provided apparatus for use in providing a security check, said apparatus comprising:

input means for receiving a digital signature provided by a user;

first storage means for storing one or more reference digital signatures and respective associated information items identifying the authorised users who provided the reference signatures;

second storage means for storing previous digital signatures obtained in previous recognition attempts attributed to the identified authorised user; and first processing means for accessing the first storage means, comparing a received digital signature with one or more reference digital signatures and, in the event a measure of similarity between the received digital signature and a reference digital signature exceeds a first predetermined threshold of similarity, identifying the user as the originator of the received digital signature, second processing means for accessing the second storage area, comparing the received digital signature with previous signatures associated with previous recognition attempts attributed to the identified authorised person and invalidating the identification in the event a second measure of similarity between the received digital signature and a previous digital signature exceeds a second predetermined threshold.

By additionally considering the similarity between digital signatures submitted in previous recognition attempts, the apparatus offers a higher degree of security than that offered by known security check apparatus.

BRIEF DESCRIPTION OF THE DRAWINGS

An embodiment of the invention will now be described, by way of example only, with reference to the drawings, of which.

DETAILED DESCRIPTION

Figure 1:
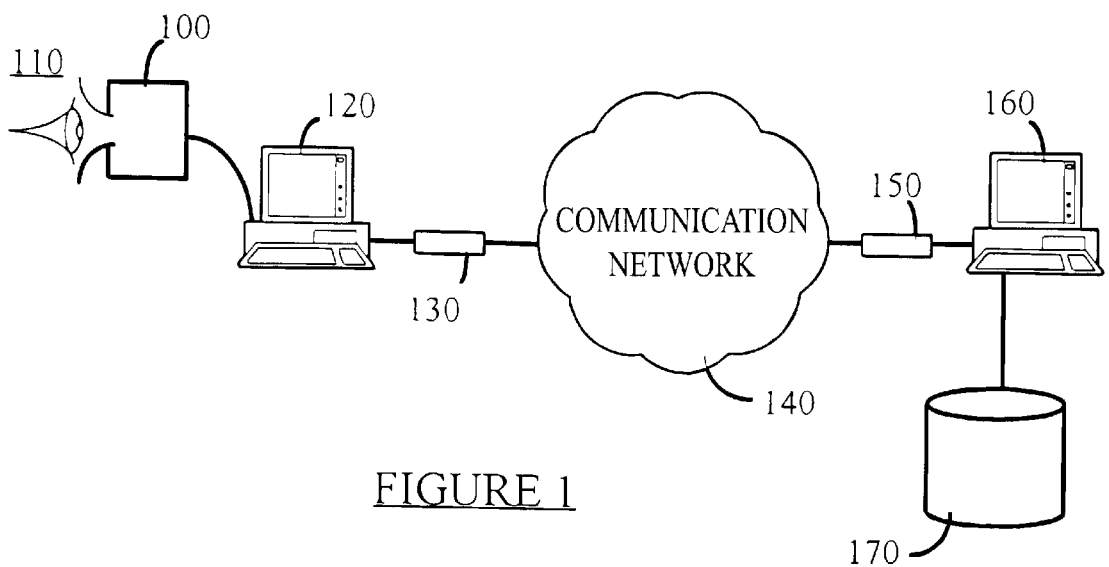
FIG. 1 is a diagram which illustrates an exemplary personal identification, client/server system.

According to FIG. 1, an iris code generator 100 is arranged to capture an image of an eye 110 of a user. The iris code generator is a hand held device as described in the applicant's co-pending patent applications PCT/GB97/01524, PCT/GB97/01525, and PCT/GB97/01526 which are incorporated herein by reference. The generator 100 encodes the captured image into a 256-byte iris code according to the technique described in U.S. Pat. No. 5,291,560, which is also incorporated herein by reference. The generator 100 then transmits the iris code to a client computer system 120 arranged to receive the iris code and subsequently transmit the iris code via a communications channel to a recognition server 160. In future embodiments, it is envisaged that the generator 100 and the client computer system 120 will be embodied in a single, dedicated hardware device.

The communications channel comprises a modem 130 connecting the computer 120 to a communications network 140, such as a secure private data network. The network 140 routes the iris code via a second modem 150 to the server 160. The server 160 is connected to an external storage device 270, for example a hard disk drive and enacts a recognition process on the basis of the received iris code, as described in more detail below.

The server 160 identifies and authenticates an authorised person who is attempting to gain access to further facilities or services. A further facility (not shown) might be a secure communications network which is accessible via the recognition server 160 only after positive recognition.

Figure 2:
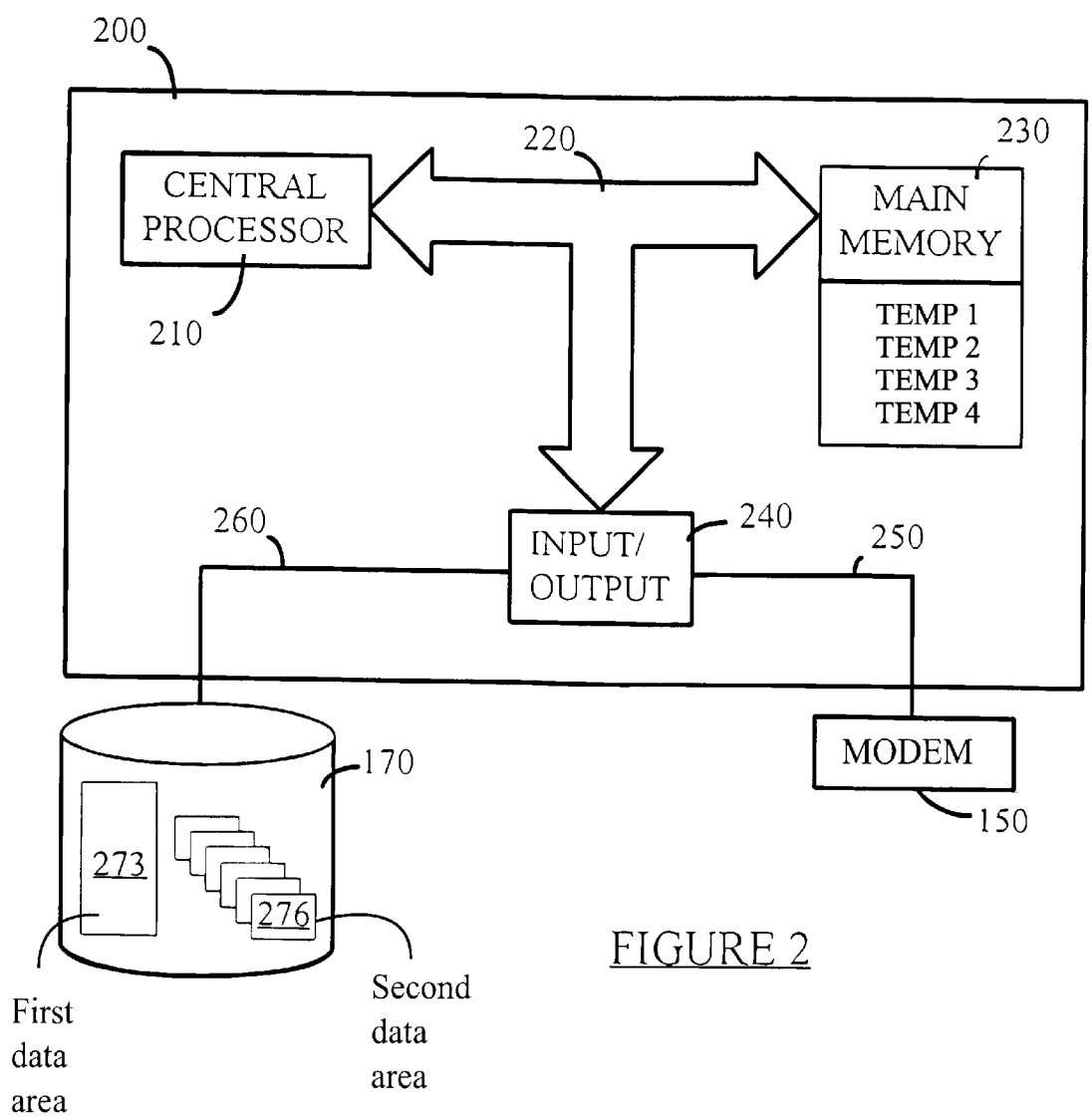
FIG. 2 is a diagram which illustrates in more detail the server processing platform of the system in FIG. 1.

FIG. 2 illustrates the main components of the processing platform 200 of the recognition server 160. The server platform 200 is a conventional computing platform, such as a Sun (TM) SPARCstation 20/51, operating the Unix (TM) operating system and supporting the Oracle (TM) database management system. The platform 200 comprises the standard features of a central processor 210 connected via address and data buses 220 to main memory 230 and an input/output (I/O) controller 240. The modem 150 is connected to the I/O controller 240 via a serial connection 250, and the hard disk drive 170 is connected via a parallel line 260 to the I/O driver 240.

The disk drive 170 includes two Oracle data storage areas. A first data storage area 273 contains reference iris code information for a plurality of authorised persons and the second data storage area 276 contains historic iris code information for each respective authorised person.

Figure 3:
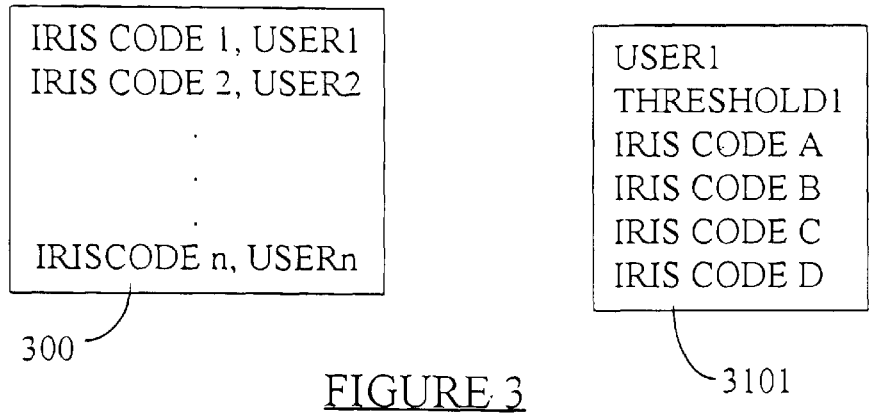
FIG. 3 is a diagram which illustrates the arrangement of data required for user recognition

The first and second data storage areas are illustrated in more detail in FIG. 3. The first data area 273 contains reference iris codes 1 to n in a single database table 300, where each iris code is associated with an authorised person 1 to n. A reference iris code is one which has been obtained by an appropriate authorised person enrollment procedure. The procedure could take many different forms, but would typically require an authorised person to visit an enrollment centre where a series of iris codes could be generated and a single reference iris code could be selected.

The second data area 276 is split into n separate database tables 3101 to 310n, one table being indexed for each authorised person. As illustrated, table 3101 contains a value for a threshold level of similarity and iris codes A to D for authorised person 1. The iris codes A to D are historic iris codes which have been received by the server 160 on previous recognition attempts attributed to authorised person 1. The size of the table for authorised person 1 increases by one iris code each time authorised person 1 is recognised, as described below. In practice, however, since data storage capacity is not limitless, the number of iris codes stored might be restricted to, for example, the most recent hundred.

An iris recognition procedure will now be described with reference to the flow chart shown in FIG. 4. The procedure itself comprises appropriate software processes and routines written in Oracle SQL and C++.

Figure 4:
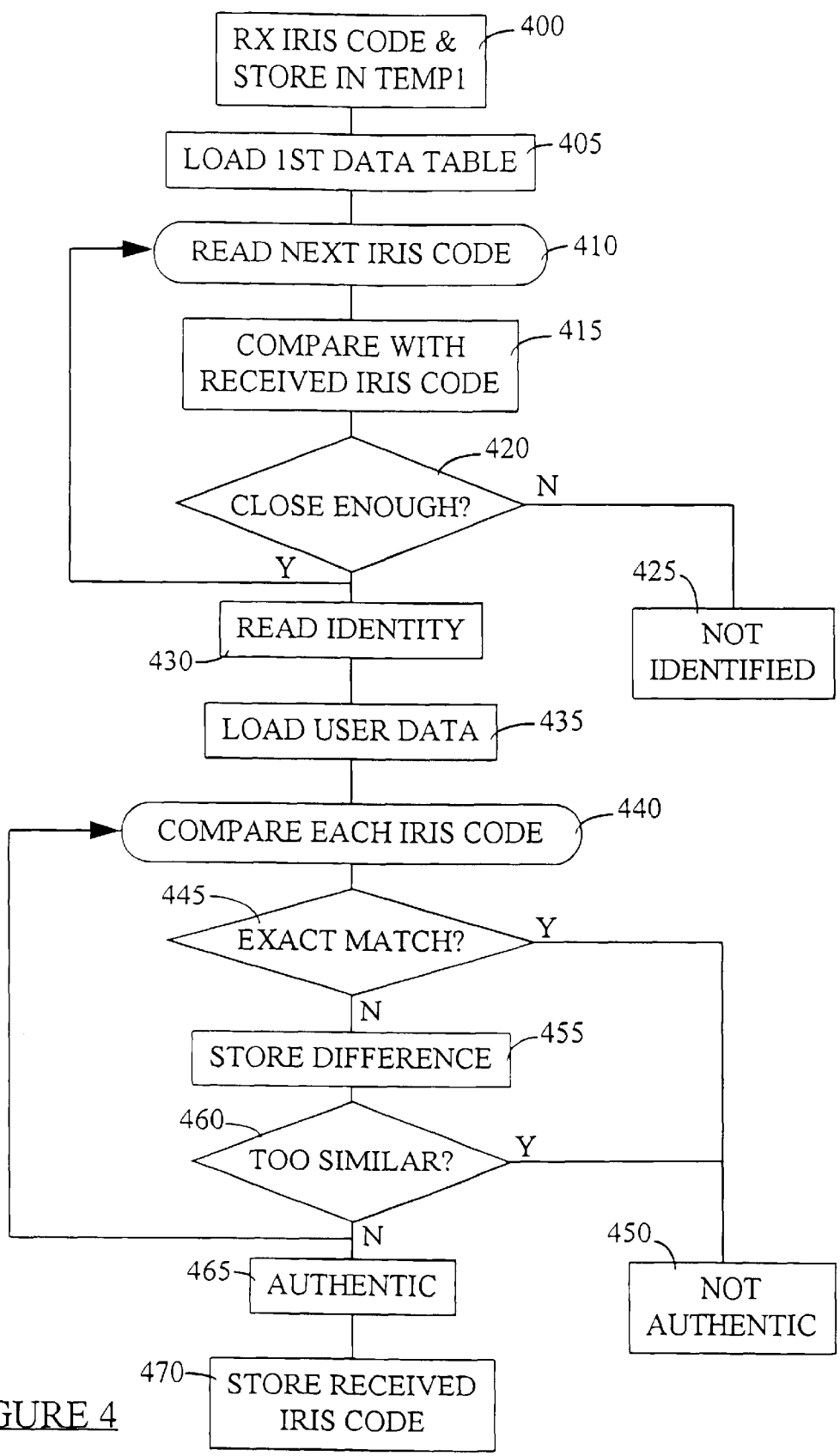
FIG. 4 is a flow diagram which illustrates the steps required to enact user recognition.

According to FIG. 4, in step 400 the recognition server 160 receives an iris code from a client 120. The iris code is stored in a first temporary memory location (TEMP1) in main memory 230. Then, in step 405, the data table in the first data storage area 273 is read into main memory 230. If the size of the data table is larger than main memory, then the file server 160 is arranged to read appropriately sized portions of the table to main memory as required in a normal fashion. In steps 410, 415 and 420, the server 160 accesses main memory 230 and reads and compares each reference iris code with the received iris code stored in the temporary memory location (TEMP1) until a match is found. The comparison is carried out on per-bit basis (where there are 256×8 bits), and the number of matching bits is derived for each reference iris code. In this embodiment, a match, which constitutes an identification, is obtained even when up to thirty percent of the bits differ.

The threshold value of around thirty percent was determined heuristically on the basis of extensive trials, the results of which are discussed in more detail in "High confidence visual recognition of persons by a test of statistical independence", Daugman J G, IEEE Transactions on pattern analysis and machine intelligence (PAMI), Vol. 15, Nov. 11, 1993. Of course, the value or the comparison method may vary depending on the type, or variation in different types, of iris image capturing device 100 used, and on other factors such as the image capturing environment, the iris code generating algorithm used and the level of security required for the system. For example, lower security systems might operate on shorter, less detailed iris codes.

In step 420, if no match is found, the iris code is deemed unidentified and in step 425, an appropriate signal is returned to the client 120.

Assuming a match is found for the received iris code, in step 430 the server 160 reads the identity of the authorised person associated with the respective reference iris code into a second temporary memory location (TEMP2). Assuming the matching reference iris code is associated with authorised person 1, in step 435 the server 160 accesses the second data storage area 276 and reads into the main memory 230 the table 3101 containing the historic iris codes attributed to authorised person 1. Also, the threshold value for the respective measure of similarity for authorised person 1 is read into a third temporary memory location (TEMP3)

In step 440, each historic iris code is read from main memory and compared with the received iris code. For each iris code comparison, in step 445, if an exact match is found the received iris code is deemed fraudulent and in step 450 an appropriate message is returned by the server 160 to the client 120 and the process terminates.

The criteria that an exact match implies a fraudulent iris code stems from the fact that it is unlikely that two iris codes, even originating from the same authorised person, will match. Thus, an exact match indicates that the matched historic iris code may have been intercepted by a unauthorised user and copied when it was originally transmitted to the server 160 during a previous recognition attempt by the authorised person (the unauthorised user thereafter transmitting the iris code to the server in an attempt to masquerade as the authorised person to, for example, gain access to a secure system). This type of attempt to masquerade as an authorised person by using intercepted data is sometimes known as a replay attack.

If there is no exact match, then a value for the percentage of bits which match (which will then be less than 100) is derived and stored in a fourth temporary memory location (TEMP4) in step 455. Then, in step 460, if the measure of similarity stored in the fourth temporary memory location (TEMP4) is greater than the threshold measure of similarity stored in the third temporary memory location TEMP3), the received iris code is deemed fraudulent and in step 450 an appropriate message is returned by the server 160 to the client 120 and the process terminates.

If the received iris code fulfils both criteria for recognition not exactly the same and not too similar—for all historic iris codes, then in step 465 a signal is returned by the server 160 to the client 120 indicating that the authorised person has been successfully identified and authenticated. Finally, in step 470, the received iris code, which is stored in the first temporary memory location (TEMP1), is written as a historic iris code to database table 3101 for authorised person 1.

The criteria that an iris code is fraudulent if it has a similarity to a historic iris code greater than a predetermined threshold level of similarity stems from the fact that a very close match is unlikely, although not as unlikely as an exact match. The threshold value is again determined heuristically on the basis of trials, as described below. The value will again vary in dependence on the type, or variation in different types, of iris image capturing device 100 used, and on other factors such as the image capturing environment, the iris code generating algorithm used and the level of security required for the system.

Figure 5:
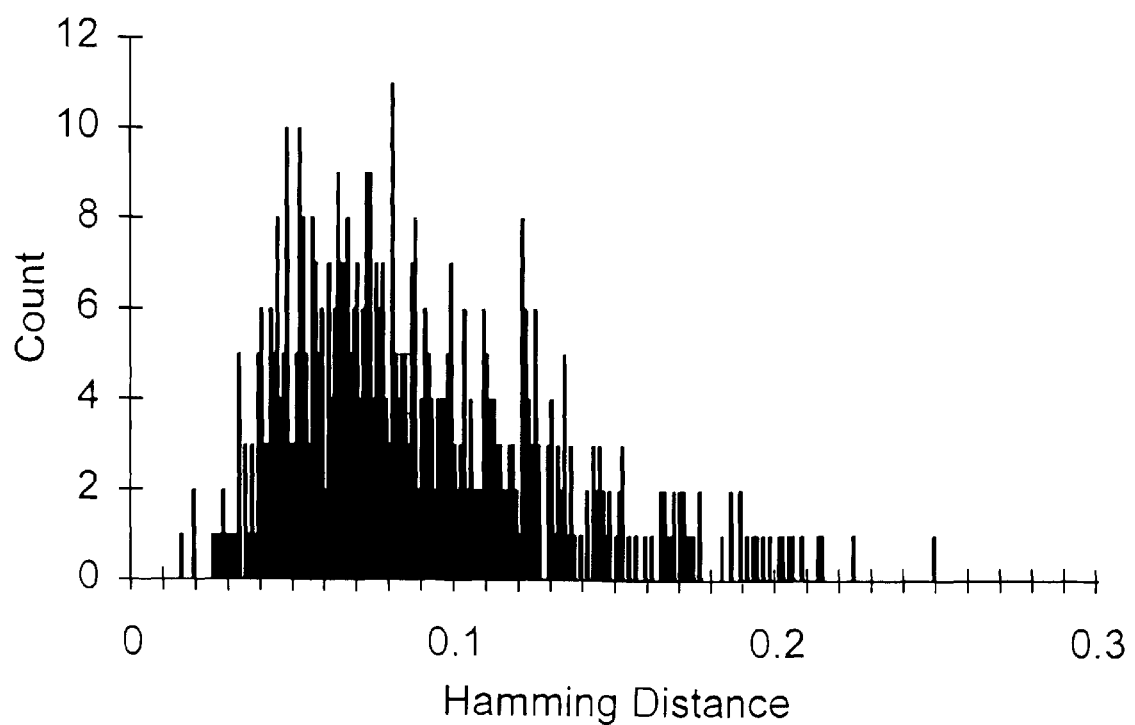
FIG. 5 is a graph which shows the characteristics of iris code recognitions for an authorised person.

A recognition trial was carried out in October 1996 where trained members of a trial team aligned themselves and triggered a basic recognition system to recognise them. FIG. 5 shows the recognition Hamming distances for 546 recognitions which were triggered when the user's eye had been aligned. The mean Hamming distance for these recognitions was 0.090 (i.e. 9% of bits disagreeing), with a standard deviation of 0.042. These results show that there is a distribution of recognition Hamming distances for users and similar results are to be expected for commercial iris recognition systems.

By considering the results used to generate the graph in FIG. 5, the following probabilities of obtaining a false recognition for a person for a particular threshold value can be derived.

| Threshold (percent) | Number of expected failures in 546 attempts |
| --- | --- |
| 2 | 3 |
| 3 | 9 |
| 4 | 30 |
| 5 | 83 |

For example, if the threshold is fixed at three percent, the results indicate that nine in every 546 recognition attempts by an authorised person would be invalid.

In practice, the server 160, faced with an iris code which has greater than ninety eight percent of its bits the same as a historic iris code might, instead of terminating the procedure, request the client 120 to obtain and return a further iris code from the user to be identified and authenticated. The client might, in turn, control the iris code generator to vary the level of illumination of the user's eye or the focal length of the optics within the iris code generator, before capturing another image of the user's eye. Providing a second chance using an altered iris image in this way should reduce the number of occasions on which authorised persons are refused access to the secure network.

The skilled person will appreciate that reduced criteria for authentication may be applied to the scenario described above. For example, the identification might only be invalidated (and a second iris code requested) only in the event of an exact match. Other, more sophisticated implementations for comparing iris codes might take into account the relative likelihood of a certain bit mismatch (not all bits in an iris code are equally likely to change) or the statistical consistency of previous identifications for that iris.

In practice, it may be that more complex searching algorithms are used in the first processing stage for scanning the first data area 273. For example, in the case of iris recognition, it may be necessary to scan the first data area several times before a matching reference iris code is found, for example, each time considering different rotations of the eye. Different eye rotations are caused by users presenting their heads at different tilted angles and due to torsional eye rotations. It may therefore be more advantageous to use the dedicated database search algorithm described in U.S. Pat. No. 5,291,560 for the purposes of the first processing stage.

The nature of an iris code generated using the above-referenced U.S. patent dictates that not all bits in an iris code are equally likely to become corrupted. The algorithms used to encode the iris consider the iris features at various levels of scale and/or detail and allocate information reflecting these features to bits in specific positions within each iris code. It might therefore be reasonable to suppose that the bits of an iris code which correspond to the more macroscopic features are less susceptible to being incorrectly set. Conversely, bits in an iris code which correspond to small or highly detailed features of an iris may be more susceptible to being set incorrectly.

It is envisaged by the inventors that the degree of susceptibility of specific bits being incorrectly set will be very dependent upon the configuration of the client hardware, the precise iris code generating algorithms used, variations in illumination, slight differences in focus, because of dirt, eyelids, etc., occluding the iris and certain characteristics of the user. This is because it is reasonable to expect different types of iris code corruption depending upon the cause. For example, eyelid closure affects specific large portions of the iris whilst particles of dust or dirt are more localised. Differences in focus will affect all parts of the iris but will have a greater effect on the higher spatial frequency components of an iris image. Dirt in the optical path of an imaging device associated with the client hardware is likely to affect the same part of an iris code on each recognition whilst noise (e.g. from a CCD chip) is more variable in its effect. Changes in the localisation software used to isolate the iris portion of a captured image may in turn affect the position of the boundaries used in iris code generation. The result is that bits representing detailed features will on the whole be affected more than bits corresponding to microscopic features.

It is, thus, expected that a more sophisticated implementation of the invention would consider the likelihood of each bit or group of bits in the iris code being incorrectly set. In determining the likelihood of bits becoming incorrectly set, it would be apparent to the skilled person that the decision process can make use of the statistical properties of the iris code generated, and the histories of the client and authorised person.

Further, the reference iris code or any of the threshold values might change over time in dependence on shifts in identification and/or authentication characteristics. For example, if it becomes apparent that a particular authorised person generally achieves consistently similar iris code readings, which are within twenty percent of the reference iris code, the threshold for similarity for identification purposes might be raised from seventy percent to seventy five percent. Similarly, the threshold above which a received iris code and a historic iris code are deemed to be similar might be reduced from two percent to one percent. Such variations in parameters might be enacted periodically and automatically by the recognition server 160. Conversely, if an authorised person is consistently not recognised due to poor iris code readings, the thresholds for that authorised person might be lowered, depending on how poor the iris code readings are and how much the security of the system might be compromised.

Although the above described embodiment describes the use of a software program to control a processor to carry out a determination as to whether a user is an authorised person or not, it might be faster to use a hardware configuration to carry out at least the digital signature comparison steps.

Also, the first comparison step of the above embodiment involves a comparison with each of the reference digital signatures in turn. Hence, the apparatus described is able to determine which authorised user is trying to pass the security check. The present invention also has utility in situations where the purpose of the security checking apparatus is to verify the identity of a user. For example, users of conventional automated teller machines are expected to insert a card carrying a data recording magnetic strip before carrying out a transaction. The card is, in effect, serving as an identity token—the user is only allowed to carry out a financial transaction if the PIN entered he or she enters matches the PIN stored in relation to the authorised person who was issued the card. Were the use of a PIN in conventional apparatus to be replaced by the use of a digital signature, then the central server would need only to verify that the user's digital signature corresponded (but not too closely) to the reference signature associated with the authorised person who was issued the card.

It will be seen that the above embodiment exploits the inherent variability in an inconstant digital signature. Hence, somewhat paradoxically, embodiments of the present invention might be worsened by improving the apparatus used to capture the digital signature. For example, improvements in the optical apparatus used in capturing an image of an iris pattern might result in less variability in the captured image of an authorised person's iris. This, in turn, would lead to a greater chance of the occurrence of an close match between two iris codes provided by an authorised person on different occasions. It will be seen that the discrimination between a fraudulent user and an authorised person would then become more difficult.

In such circumstances, the above-described embodiment might be improved by adding a variable parameter (pupil diameter for example) to an iris code in order to provide a digital signature which varies significantly between an authorised user's attempts to pass the security check.

What is claimed is:

1. A method of determining whether a person is authorised to satisfy a security check on the basis of an inconstant digital signature, the method comprising:

comparing an instant digital signature provided by a person attempting to satisfy the security check with a reference digital signature;

identifying the person as the person who provided said reference digital signature responsive to said comparison revealing said signatures to be sufficiently similar;

comparing said instant digital signature also with one or more previous digital signatures provided in previous attempts to satisfy the security check; and invalidating the identification responsive to said comparison revealing said instant signature to be improbably similar to one or more of the previous signatures.

2. A method according to claim 1, wherein said identification is invalidated only on said instant signature being identical to a previous signature.

3. A method according to claim 1 wherein the inconstant digital signature comprises biometric information.

4. A method according to claim 3, wherein the biometric information comprises an iris code.

5. A method according to claim 1 wherein:
comparing the instant digital signature with the reference signature involves calculating a first measure of similarity between the instant and reference signatures;
the user is identified as an authorised person on the first measure of similarity exceeding a predetermined first threshold;
comparing the instant digital signature with one or more previous digital signatures involves calculating one or more second measures of similarity between the instant and previous signatures; and
the identification of the user is invalidated on the second measure of similarity exceeding a predetermined second threshold higher than the first.

6. A method according to claim 5 wherein one or both of said first and second thresholds are adaptable.

7. A method according to claim 6 wherein the first and second thresholds are adapted in response to characteristics of the previous attempts by the person to satisfy the security check.

8. Apparatus for use in providing a security check, said apparatus comprising:
input means for receiving a digital signature provided by a user;
first storage means for storing one or more reference digital signatures and respective associated information items identifying the authorised users who provided the reference signatures;
second storage means for storing previous digital signatures obtained in previous recognition attempts attributed to the identified authorised user; and
first processing means for accessing the first storage means, comparing a received digital signature with one or more reference digital signatures and, in the event a measure of similarity between the received digital signature and a reference digital signature exceeds a first predetermined threshold of similarity, identifying the user as the originator of the received digital signature,
second processing means for accessing the second storage area, comparing the received digital signature with previous signatures associated with previous recognition attempts attributed to the identified authorised person and invalidating the identification in the event a second measure of similarity between the received digital signature and a previous digital signature exceeds a second predetermined threshold.

9. Apparatus for providing a security check, said apparatus including:
one or more storage media having recorded therein:
data representing one or more reference signatures provided by respective authorised persons;
data associated with each reference signature, said data representing one or more previous signatures provided in one or more previous attempts to satisfy said security check; and
processor readable code processable to determine whether a received digital signature was provided by an authorised user, said code comprising:
received signature comparison code processable to compare an instant digital signature provided by a person attempting to satisfy the security check with a reference digital signature;
user identification code processable to identify the user as the person who provided said reference digital signature responsive to said comparison revealing said signatures to be sufficiently similar;
supplemental received signature comparison code processable to compare said instant digital signature and one or more previous digital signatures provided in previous attempts to satisfy the security check; and
identification invalidation code processable to invalidate the identification responsive to said comparison revealing said instant signature to be improbably similar to one or more of the previous signatures.

10. A program storage device readable by a processing apparatus, said device tangibly embodying a program of instructions executable by the processor to perform method steps for determining whether a received digital signature was provided by an authorised person, said method steps comprising:
comparing an instant digital signature provided by a person attempting to satisfy the security check with a reference digital signature;
identifying the person as the person who provided said reference digital signature responsive to said comparison revealing said signatures to be sufficiently similar;
comparing said instant digital signature also with one or more previous digital signatures provided in previous attempts to satisfy the security check; and
invalidating the identification responsive to said comparison revealing said instant signature to be improbably similar to one or more of the previous signatures.

11. A method for recognising a party comprising:
identifying the party by comparing a digital signature from the party with stored digital signatures for a plurality of different parties, where positive identification depends on a derived measure of similarity between the provided digital signature and one of the stored digital signatures exceeding a predetermined threshold of similarity, authenticating an identified party by applying pre-determined criteria to the result of a comparison between the provided digital signature, or data derived therefrom, and stored historic and/or statistical data associated with previous recognition attempts made by the identified party wherein positive authentication is performed by also comparing the provided digital signature with one or more historic digital signatures obtained from one or more previous recognition attempts for the identified party and establishing that the similarity between the provided digital signature and any historic digital signature does not equal or exceed a pre-determined second threshold.

12. A system for determining whether a person is authorised to satisfy a security check on the basis of an inconstant digital signature, the system comprising:
means for comparing an instant digital signature provided by a person attempting to satisfy the security check with a reference digital signature;

means for identifying the person as the person who provided said reference digital signature responsive to said comparison revealing said signatures to be sufficiently similar;

means for comparing said instant digital signature also with one or more previous digital signatures provided in previous attempts to satisfy the security check; and means for invalidating the identification responsive to said comparison revealing said instant signature to be improbably similar to one or more of the previous signatures.

13. A system according to claim 12, wherein said identification is invalidated only on said instant signature being identical to a previous signature.

14. A system according to claim 12 wherein the inconstant digital signature comprises biometric information.

15. A system according to claim 14, wherein the biometric information comprises an iris code.

16. A system according to claim 12 wherein:

said means for comparing the instant digital signature with the reference signature calculates a first measure of similarity between the instant and reference signatures;

the user is identified as an authorised person on the first measure of similarity exceeding a predetermined first threshold;

said means for comparing the instant digital signature with one or more previous digital signatures calculates one or more second measures of similarity between the instant and previous signatures; and the identification of the user is invalidated on the second measure of similarity exceeding a predetermined second threshold higher than the first.

* * * * *